(12) United States Patent
Pedziwiatr

(10) Patent No.: US 8,978,376 B1
(45) Date of Patent: Mar. 17, 2015

(54) GAS-POWERED BUOYANT FORCE SYSTEMS AND METHOD

(71) Applicant: Edward A. Pedziwiatr, Jensen Beach, FL (US)

(72) Inventor: Edward A. Pedziwiatr, Jensen Beach, FL (US)

( * ) Notice: Subject to any disclaimer, the term of this patent is extended or adjusted under 35 U.S.C. 154(b) by 0 days.

(21) Appl. No.: 14/311,438

(22) Filed: Jun. 23, 2014

Related U.S. Application Data

(63) Continuation-in-part of application No. 13/971,167, filed on Aug. 20, 2013.

(51) Int. Cl.
*F03B 17/02* (2006.01)

(52) U.S. Cl.
CPC ..................... *F03B 17/02* (2013.01)
USPC .......................................................... 60/496

(58) Field of Classification Search
USPC .......................................................... 60/496
See application file for complete search history.

(56) References Cited

U.S. PATENT DOCUMENTS

| | | |
|---|---|---|
| 272,656 A | 2/1883 | Cook |
| 3,412,482 A | 11/1968 | Kusmer |
| 3,934,964 A | 1/1976 | Diamond |
| 4,363,212 A | 12/1982 | Everett |
| 4,407,130 A | 10/1983 | Jackson |
| 4,498,294 A | 2/1985 | Everett |
| 5,372,474 A | 12/1994 | Miller |
| 5,555,728 A | 9/1996 | Welch, Jr. |
| 5,944,480 A | 8/1999 | Forrest |
| 5,996,344 A | 12/1999 | Frenette et al. |
| 6,115,950 A | 9/2000 | Al-Mutairi |
| 8,646,267 B1 | 2/2014 | Pedziwiatr |
| 2012/0131914 A1* | 5/2012 | Gibson et al. .................. 60/496 |

* cited by examiner

*Primary Examiner* — F. Daniel Lopez
(74) *Attorney, Agent, or Firm* — Arthur Jacob

(57) ABSTRACT

Energy is derived from the flow of gas in an existing, active gas pipeline. A buoyant power unit includes a wheel assembly having a wheel mounted for rotation about a horizontal axis, submerged within a tank of water and carrying receivers located and configured for turning the wheel in response to the reception of gas from the gas pipeline. Gas is drawn from the gas pipeline at an upstream location, is directed to the receivers of the wheel to turn the wheel in response to buoyant forces as the gas rises within the water, and is returned to the gas pipeline, at a downstream location. The wheel is coupled to a generator for producing usable energy. In one arrangement, a plurality of such buoyant power units are connected serially between the upstream and downstream locations. In another arrangement, injectors inject the gas directly into each receiver.

15 Claims, 4 Drawing Sheets

GAS-POWERED BUOYANT FORCE SYSTEMS AND METHOD

This application is a continuation-in-part of U.S. patent application Ser. No. 13/971,167, filed Aug. 20, 2013.

The present invention relates to gas-powered systems that utilize the constant flow of natural gas through an existing gas pipeline to power an underwater mechanism for creating a lift force resulting from buoyancy in water, which lift force is employed to generate power in the form of work and, more specifically, electricity.

BACKGROUND OF THE INVENTION

There are vast numbers of systems and methods available today to satisfy the demand for electrical energy. The production of clean energy, environmentally acceptable, or renewable clean energy which, in the process of creation, does not emit substances harmful to the environment and humanity is a desirable objective.

Currently, dominant popular methods used to produce clean electrical energy are:
A: Wind, powering windmills;
B: Water turbines generating electricity; and
C: Solar panels producing electricity through light.

Each of these systems is successful in generating clean electrical energy. However, there are many disadvantages to be taken into consideration, such as noise factors and the distortion of otherwise beautiful landscapes and sea areas. In addition, it becomes necessary to use large land areas to construct solar fields, rendering valuable property useless for any other purpose.

BRIEF SUMMARY OF THE INVENTION

On Mar. 2, 2012, I filed a patent application in the United States Patent and Trademark Office, under Ser. No. 13/410,585, now U.S. Pat. No. 8,646,267, for an invention in buoyant force power generation. In that invention, clean power is created by utilizing buoyancy in water to rotate a wheel assembly in a confined environment, such as under water, by utilizing the buoyancy of air or gas in water to move and rotate a wheel assembly. Natural and unlimited renewable resources can be directed to such energy creation.

DETAILED DESCRIPTION OF THE INVENTION

Figure 1:
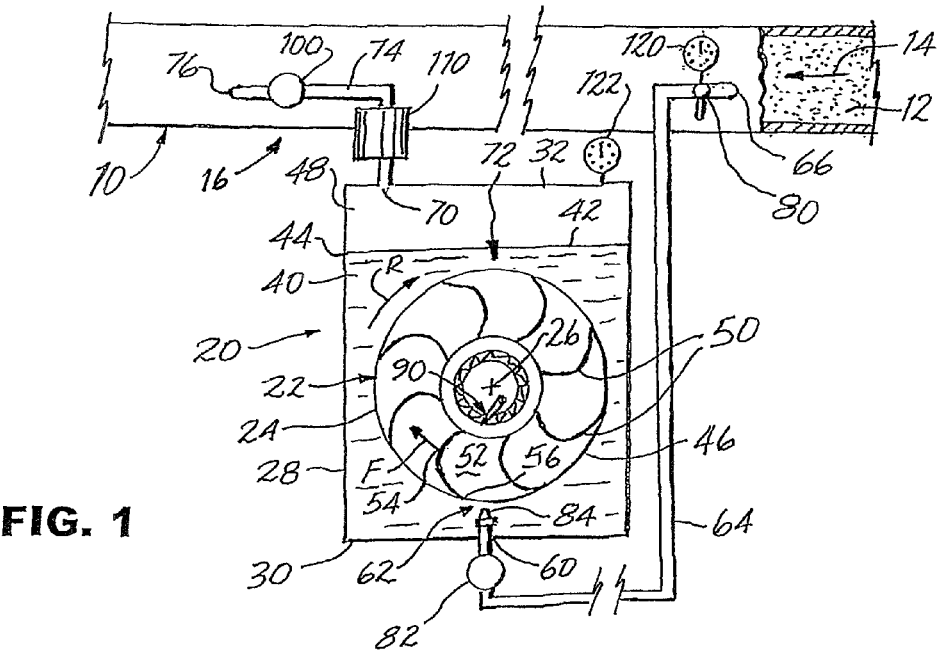
FIG. 1 is a largely diagrammatic elevational view of an apparatus constructed in accordance with the present invention and operating in accordance with a method of the invention.
Figure 2:
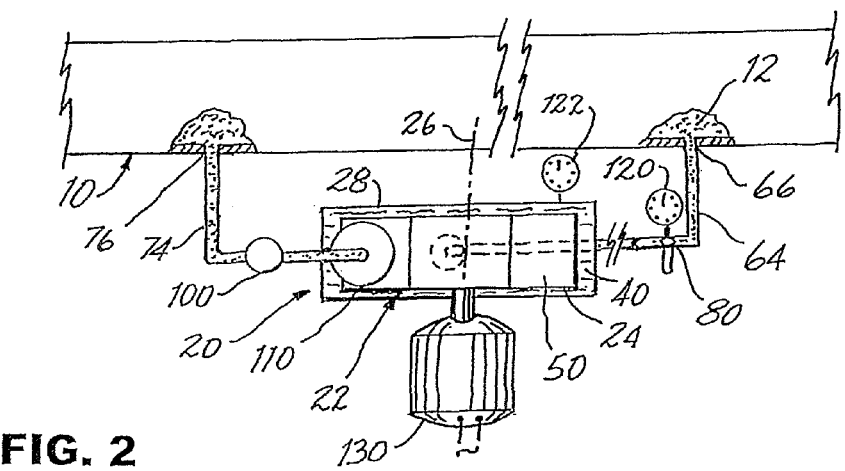
FIG. 2 is a largely diagrammatic plan view of the apparatus of FIG. 1 operating in accordance with the method.

Referring now to the drawing, and especially to FIGS. 1 and 2 thereof, an existing active gas pipeline is depicted diagrammatically at 10 and is seen to be transporting a flow of natural gas 12 in a downstream direction 14, in a now conventional manner. A power generating system 16 constructed and operating in accordance with the present invention is illustrated diagrammatically in the form of a buoyant power unit 20 and is seen to include a wheel assembly 22 having a wheel 24 mounted for rotation about a horizontal axis of rotation 26 and located within a suitable container in the form of a tank 28 having a bottom 30 and a top 32 spaced vertically above the bottom 30, the tank 28 being filled with a liquid, shown in the form of water 40, up to a predetermined surface 42 placed at a prescribed level at waterline 44 such that the perimeter 46 of the wheel 24, which perimeter 46 extends circumferentially around the wheel 24, is submerged in water 40. The waterline 44 is located below the top 32 of the tank 28, to establish an output chamber 48 between the predetermined surface 42 and the top 32 of the tank 28.

A plurality of receivers are spaced apart circumferentially adjacent the perimeter 46 of the wheel 24, the receivers being shown diagrammatically in the form of cupped blades 50, each extending in a direction perpendicular to the plane of the paper in FIG. 1, and each being cupped in a circumferential direction to establish an interior 52 with a closed end 54 and a circumferentially opposite open end 56. The blades 50 are oriented with each open end 56 circumferentially confronting a corresponding closed end 54 of a next-consecutive blade 50. A gas inlet 60 is placed at a lower input station 62 in juxtaposition with the perimeter 46 of the wheel 24 adjacent a lowermost location and is connected to an inlet gas conduit 64 which communicates with the gas pipeline 10 at an upstream location 66. A gas outlet 70 is placed adjacent an upper station 72 in juxtaposition with the output chamber 48 at an uppermost location and is connected to an outlet gas conduit 74 that communicates with the gas pipeline 10 at a downstream location 76.

Gas, under pressure, is admitted into inlet gas conduit 64 through a flow control valve 80 placed adjacent the upstream location 66, where gas is present at a first pressure, and is passed through a one-way valve 82 to gas inlet 60 to be directed, as by an inlet nozzle 84, for introduction into the interior 52 of an adjacent blade 50, thereby displacing water from the interior 52 and exerting a buoyant force F directed to drive wheel 24 in a given direction of rotation R, so as to turn the wheel 24 in the direction R about the axis of rotation 26. As each consecutive blade 50 is passed through lower input station 62, gas is introduced into the interior 52 of the blade 50 to continue rotation of wheel 24 in the direction of rotation R. Rotation of wheel 24 is restricted to direction R by virtue of a one-way mechanism shown in the form of a pawl and ratchet arrangement 90.

Upon a blade 50 reaching the upper station 72, gas will be released from the corresponding interior 52 to enter output chamber 48. Gas in output chamber 48 then will be returned to gas pipeline 10, at the downstream location 76, where gas is present at a second pressure lower than the first pressure at upstream location 66. The existing difference in pressure between the first pressure, at the upstream location 66, and the second pressure, at the downstream location 76, enables the passage of gas through power unit 20 and through the outlet gas conduit 74 and a one-way valve 100. A filter 110 is placed between the chamber 48 and the outlet gas conduit 74 so as to remove water which otherwise might pass into the gas pipeline 10. In the preferred construction, gas pressures are monitored by a pressure gauge 120 at the flow control valve 80 and a pressure gauge 122 at the chamber 48.

Wheel 24 is coupled to an electric power generator 130, thereby producing absolutely clean energy through buoyant power provided by the power generating system and method of the present invention.

Figure 3:
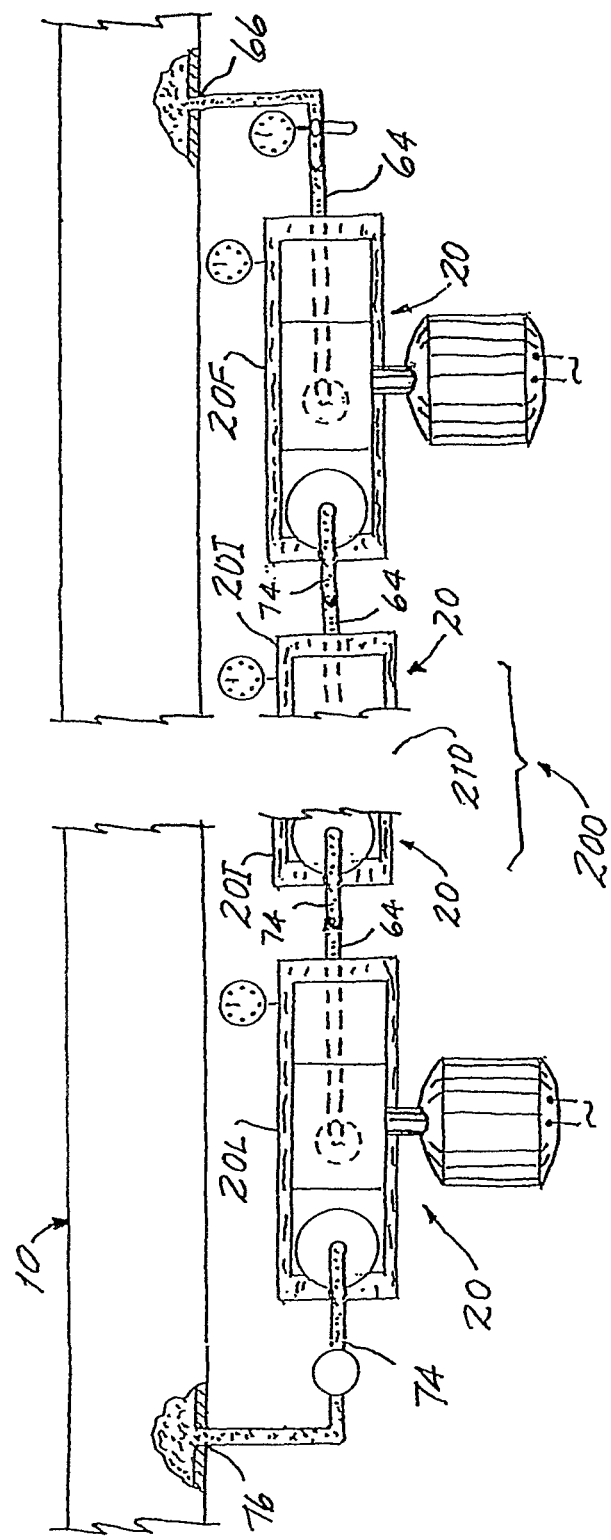
FIG. 3 is a largely diagrammatic plan view similar to FIG. 2, and showing another embodiment of the present invention operating in accordance with the method.

Existing gas pipelines sometimes extend over thousands of miles and can host hundreds, or even thousands of buoyant power units constructed in accordance with the present invention, with practically no maintenance requirements and no gas loss at all. Thus, with reference to FIG. 3, multiple buoyant power units are shown in a system 200 comprised of a plurality of buoyant power units 20, each constructed in accordance with the invention and all connected together serially. In the illustration of FIG. 3, the first unit 20 of the system 200 is shown at 20F and is seen to be connected to gas pipeline 10 at upstream location 66, through corresponding gas inlet conduit 64, while the last unit 20 of the system 200 is shown at 20L and is seen to be connected to gas pipeline 10 at downstream location 76, through corresponding gas outlet conduit 74. The break at 210 in the diagrammatic view indicates that a plurality of intermediate units 20, two of which are illustrated by fragmentary depictions at 201, are connected serially between first unit 20F and last unit 20L, with the gas outlet conduit 74 of each unit previous to last unit 20L connected to the gas inlet conduit 64 of a next-consecutive unit until the series of units is complete, and the gas outlet conduit 74 of the last unit 20L is connected to the gas pipeline 10 at downstream location 76. In this manner, buoyant power is derived over a long run of an existing gas pipeline. In cities, where gas is stored for distribution to end consumers, buoyant power units of the present invention can be installed along distribution channels to provide power to the city, wherever considered necessary.

Figure 4:
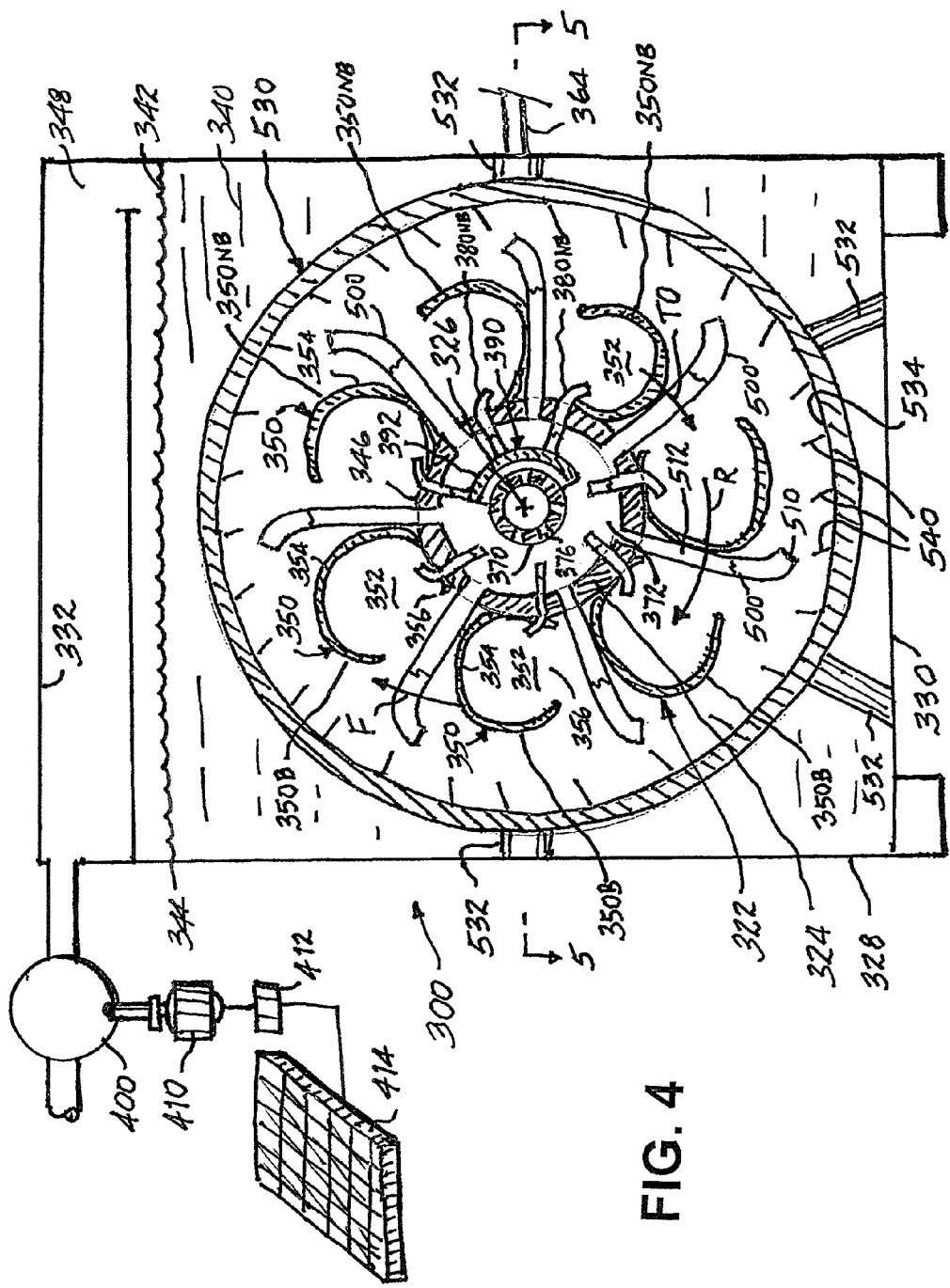
FIG. 4 is a fragmentary, largely diagrammatic elevational view of another apparatus constructed in accordance with the present invention and operating in accordance with a method of the invention.
Figure 5:
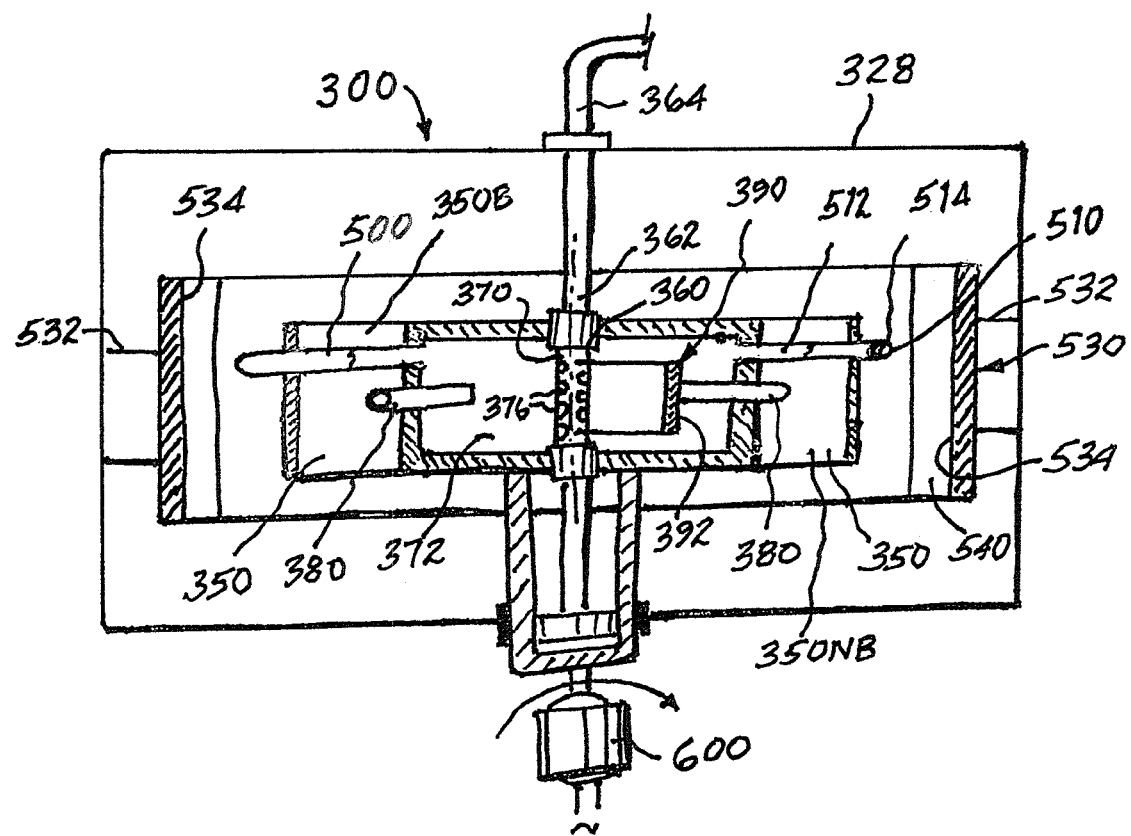
FIG. 5 is a fragmentary, largely diagrammatic cross-sectional view of the apparatus, taken along line 5-5 of FIG. 4, operating in accordance with the method.

Turning now to FIGS. 4 and 5, another embodiment of the present invention is illustrated diagrammatically in the form of a buoyant power unit 300 and is seen to include a wheel assembly 322 having a wheel 324 mounted for rotation about a horizontal central axis of rotation 326 and located within a suitable container in the form of a tank 328 having a bottom 330 and a top 332 spaced vertically above the bottom 330, the tank 328 being filled with a liquid, shown in the form of water 340, up to a predetermined surface 342 placed at a prescribed level at waterline 344 such that the perimeter 346 of the wheel 324, which extends circumferentially around the wheel 324, is submerged in water 340. The waterline 344 is located below the top 332 of the tank 328, to establish an output chamber 348 between the predetermined surface 342 and the top 332 of the tank 328.

A plurality of receivers are placed consecutively along the perimeter 346, spaced apart circumferentially around the wheel 324, the receivers being shown in the form of cup-shaped receptacles 350, each having an interior 352 with a closed end 354 and an open end 356, and oriented with each open end 356 circumferentially confronting a corresponding closed end 354 of a next-consecutive receptacle 350. A gas inlet 360 is placed at an inlet station 362 in juxtaposition with the central axis of rotation 326 of the wheel 324 and is connected to an inlet gas conduit 364 which communicates with a gas pipeline at an upstream location, as described above in connection with power generating system 16. A gas feed pipe 370 is placed within an inlet chamber 372 inside wheel 324 and is connected to inlet gas conduit 364 such that gas is fed into inlet chamber 372 through perforations 376 in gas feed pipe 370.

Gas, under pressure, is admitted into inlet gas conduit 364, in a manner described above in connection with power generating system 16, and is passed into inlet chamber 372. A plurality of tubular gas injectors 380 corresponding to the plurality of receptacles 350 are placed around wheel 324 and located such that each gas injector 380 communicates with a corresponding receptacle 350, and with the inlet chamber 372, for the introduction gas into the interior 352 of each receptacle 350, thereby displacing water from the interior 352 and exerting a buoyant force F directed to drive wheel 324 in a given direction of rotation R, so as to turn the wheel 324 in the direction R about the axis of rotation 326. Each injector 380 is placed and configured with respect to the interior 352 of each corresponding receptacle 350 to assure a positive displacement of all water out of each interior 352 so as to maximize the volume of gas within each receptacle 350, with a concomitant maximizing of buoyant force F.

As wheel 324 rotates in the given direction of rotation R, each receptacle 350 moves through a cycle wherein each receptacles 350 is moved through a buoyant phase, as illustrated by receptacles 350B at the left side of FIG. 4, and a non-buoyant phase, as illustrated by receptacles 350NB at the right side of FIG. 4, during each revolution of wheel 324. In order to conserve gas, while increasing the efficiency of buoyant power unit 300, a valving system 390 closes communication between inlet chamber 372 and those receptacles 350NB being moved through the non-buoyant phase. Valving system 390 includes a valve plate 392 affixed to gas feed pipe 370 so as to remain stationary while wheel 324 rotates. Valve plate 392 has an arcuate configuration and is engaged by injectors 380NB, that is, those injectors 380 that correspond to receptacles 350NB, such that communication between inlet chamber 372 and the interior 352 of each receptacle 350NB is closed, thereby precluding a flow of gas that otherwise would merely be dissipated through water 340 and into output chamber 348.

Upon a receptacle 350 reaching the non-buoyant phase, gas will be released from the corresponding interior 352 to enter output chamber 348. Gas in the output chamber 348 then will be returned to the gas pipeline, preferably assisted by a gas pump 400 actuated by a motor 410 powered by a battery 412 charged by a solar panel 414.

In order to assist rotation of wheel 324 in the given direction of rotation R, a plurality of aims 500 are carried by the wheel 324, the arms 500 being spaced apart circumferentially around the wheel, with each arm 500 extending radially from the wheel 324 to a distal tip 510. Each arm 500 has in internal passage 512 communicating with the inlet chamber 372 and extending to an orifice 514 placed adjacent the distal tip 510. Arms 500 are configured so that each orifice 514 is oriented to direct gas from the inlet chamber 372 in a direction DO, opposite to the given direction of rotation R of wheel 324 so as to create a torque TO in the given direction of rotation R, thereby assisting rotation of wheel 324 in the given direction of rotation R.

In the preferred construction, a stationary cage 530 is extended circumferentially around wheel 372, spaced radially from the wheel 372, concentric with central axis of rotation 326, and secured within tank 328 by struts 532. Cage 530 includes an internal perimetral surface 534 juxtaposed with the distal tips 510 of arms 500 so as to intercept gas emanating from each orifice 514 and thereby establish a reaction that assists in creating torque TO. In order to further enhance the reaction, a plurality of vanes 540 are carried by cage 530, vanes 540 being spaced apart circumferentially along internal perimetral surface 534 and projecting radially inwardly for intercepting gas emanating from each orifice 514 to further assist in creating torque TO. Each vane 540 is configured and angled relative to cage 530 and distal tips 510 to maximize the reaction established by the flow of gas from each arm 500.

Wheel 324 is coupled to an electric power generator 600, thereby producing absolutely clean energy through buoyant power provided by the power generating system and method of the present invention.

It will be seen that the present invention attains an environmentally safe and acceptable production of abundant clean energy without the drawbacks of current conventional systems and methods of energy production.

I claim:

1. Apparatus for deriving energy from the flow of gas in an existing, active gas pipeline extending between an upstream location, where gas is present at a first pressure, and a downstream location, where gas is present at a second pressure lower than the first pressure, the apparatus comprising:
   at least one buoyant power unit having
   a tank containing a volume of liquid having a vertical depth below a predetermined surface, the tank having a bottom and a top spaced vertically above the bottom, the top being located a vertical distance above the predetermined surface so as to establish an output chamber between the predetermined surface and the top of the tank;
   a wheel mounted within the tank for rotation in a given direction of rotation about a horizontal axis of rotation, the wheel having a perimeter extending circumferentially around the wheel and being submerged below the predetermined surface of the volume of liquid;
   a plurality of receivers placed consecutively along the perimeter of the wheel, each receiver having a closed end and an open end spaced circumferentially from the closed end, the receivers being arranged with each closed end confronting the open end of a next-consecutive receiver;
   a gas inlet placed at an inlet station juxtaposed with the wheel for delivering gas into each receiver;
   an inlet gas conduit communicating with the gas inlet for conducting gas under pressure derived from the upstream location of the gas pipeline to the gas inlet;
   a gas outlet placed at an upper station juxtaposed with the output chamber;
   an outlet gas conduit communicating with the gas outlet for conducting gas from the gas outlet for return to the gas pipeline at the downstream location;
   whereby gas supplied at the upstream location under the first pressure will enter the gas inlet conduit, will be directed by the gas inlet into each receiver to exert a buoyant force in the given direction of rotation of the wheel, will be released subsequently into the chamber to pass into the gas outlet for conduct to the outlet gas conduit and return to the gas pipeline at the downstream location;
   an electric power generator coupled to the wheel for operation in response to rotation of the wheel in the given direction of rotation to provide electric power derived from the flow of gas in the gas pipeline; and
   a one-way mechanism coupled with the wheel for enabling rotation of the wheel in the given direction of rotation while precluding rotation of the wheel in a direction opposite to the given direction of rotation.

2. The apparatus of claim 1 wherein the liquid is water.

3. The apparatus of claim 1 wherein the perimeter of the wheel extends between a lowermost location and an uppermost location, and the inlet station is juxtaposed with the lowermost location.

4. The apparatus of claim 3 wherein each receiver is integral with the wheel and confronts the gas inlet when moved through the lowermost location.

5. The apparatus of claim 4 wherein the liquid is water.

6. The apparatus of claim 1 wherein the one-way mechanism comprises a pawl and ratchet arrangement.

7. The apparatus of claim 6 wherein the liquid is water.

8. A gas-powered system comprised of a plurality of buoyant power units, each constructed in accordance with claim 1 and all connected serially for connection to the gas pipeline to conduct gas from the upstream location to the downstream location.

9. Apparatus for deriving energy from the flow of gas in an existing, active gas pipeline extending between an upstream location, where gas is present at a first pressure, and a downstream location, where gas is present at a second pressure lower than the first pressure, the apparatus comprising:
   at least one buoyant power unit having
   a tank containing a volume of liquid having a vertical depth below a predetermined surface, the tank having a bottom and a top spaced vertically above the bottom, the top being located a vertical distance above the predetermined surface so as to establish an output chamber between the predetermined surface and the top of the tank;
   a wheel mounted within the tank for rotation in a given direction of rotation about a horizontal axis of rotation, the wheel having a perimeter extending circumferentially around the wheel and being submerged below the predetermined surface of the volume of liquid;
   a plurality of receivers placed consecutively along the perimeter of the wheel, each receiver having a closed end and an open end spaced circumferentially from the closed end, the receivers being arranged with each closed end confronting the open end of a next-consecutive receiver;
   a gas inlet placed at an inlet station juxtaposed with the wheel for delivering gas into each receiver;
   an inlet gas conduit communicating with the gas inlet for conducting gas under pressure derived from the upstream location of the gas pipeline to the gas inlet;
   a gas outlet placed at an upper station juxtaposed with the output chamber;
   an outlet gas conduit communicating with the gas outlet for conducting gas from the gas outlet for return to the gas pipeline at the downstream location;
   whereby gas supplied at the upstream location under the first pressure will enter the gas inlet conduit, will be directed by the gas inlet into each receiver to exert a buoyant force in the given direction of rotation of the wheel, will be released subsequently into the chamber to pass into the gas outlet for conduct to the outlet gas conduit and return to the gas pipeline at the downstream location;
   an electric power generator coupled to the wheel for operation in response to rotation of the wheel in the given direction of rotation to provide electric power derived from the flow of gas in the gas pipeline;
   an inlet chamber located within the wheel and communicating with the inlet gas conduit such that gas under pressure is conducted from the gas inlet into the inlet chamber;
   a plurality of gas injectors corresponding to the plurality of receivers, each gas injector communicating with a corresponding receiver and with the inlet chamber for injecting gas from the inlet chamber directly into each receiver; and a plurality of arms carried by the wheel, the arms being spaced apart circumferentially around the wheel, with each arm extending radially from the wheel to a distal tip;

each arm having an internal passage communicating with the inlet chamber and extending to an orifice adjacent the distal tip, the orifice being oriented to direct gas from the inlet chamber in a direction opposite to the given direction of rotation of the wheel so as to create a torque in the given direction of rotation.

10. The apparatus of claim 9 wherein rotation of the wheel in the given direction moves each receiver through a cycle wherein each receiver is moved through a buoyant phase and a non-buoyant phase, and the apparatus includes a valving system for closing communication between the inlet chamber and each gas injector during a portion of the cycle wherein a corresponding receiver is moved through the non-buoyant phase.

11. The apparatus of claim 9 including a stationary cage extending circumferentially around the wheel and spaced radially from the wheel, the cage having an internal perimetral surface juxtaposed with the distal tips of the arms for intercepting gas emanating from each orifice to assist in creating said torque.

12. The apparatus of claim 11 including a plurality of vanes carried by the cage, spaced apart circumferentially along the internal perimetral surface of the cage and projecting radially inwardly for intercepting gas emanating from each orifice to further assist in creating said torque.

13. The apparatus of claim 12 wherein rotation of the wheel in the given direction moves each receiver through a cycle wherein each receiver is moved through a buoyant phase and a non-buoyant phase, and the apparatus includes a valving system for closing communication between the inlet chamber and each gas injector communicating with a receiver being moved through the non-buoyant phase.

14. A method for deriving energy from the flow of gas in an existing, active gas pipeline extending between an upstream location, wherein the gas is at a first pressure, and a downstream location, wherein the gas is at a second pressure lower than the first pressure, the method comprising:

providing at least one buoyant power unit having a tank containing a volume of liquid having a vertical depth below a predetermined surface, the tank having a bottom and a top spaced vertically above the bottom, the top being located a vertical distance above the predetermined surface so as to establish an input chamber between the predetermined surface and the top of the tank;

mounting a wheel within the tank for rotation in a given direction of rotation about a horizontal axis of rotation, the wheel having a perimeter extending circumferentially around the wheel, and submerging the wheel below the predetermined surface of the volume of liquid;

placing a plurality of receivers consecutively along the perimeter of the wheel, each receiver having a closed end and an open end spaced circumferentially from the closed end, and arranging the receivers with each closed end circumferentially confronting the open end of a next-consecutive receiver;

conducting gas from the gas pipeline, at the upstream location, and delivering the conducted gas into each receiver at an inlet station juxtaposed with the wheel during rotation of the wheel about the axis of rotation;

directing the gas delivered into each receiver so as to exert a buoyant force upon the wheel in the given direction of rotation and thereby effect rotation of the wheel in the given direction of rotation;

subsequently releasing the gas from each receiver into the output chamber;

returning the released gas from the output chamber to the gas pipeline at the downstream location; and coupling an electric power generator to the wheel for operation in response to rotation of the wheel in the given direction of rotation to provide electric power derived from the flow of gas in the gas pipeline; and coupling a one-way mechanism with the wheel for enabling rotation of the wheel in the given direction of rotation while precluding rotation of the wheel in a direction opposite to the given direction of rotation.

15. The method of claim 14 including connecting a plurality of buoyant power units serially such that the gas conducted from the gas pipeline is delivered sequentially to serially connected buoyant power units before being returned to the gas pipeline.

* * * * *